US009407656B1

(12) United States Patent  
Roehl et al.

(10) Patent No.: US 9,407,656 B1
(45) Date of Patent: Aug. 2, 2016

(54) DETERMINING A RISK LEVEL FOR SERVER HEALTH CHECK PROCESSING

(71) Applicant: INTERNATIONAL BUSINESS MACHINES CORPORATION, Armonk, NY (US)

(72) Inventors: Michael H. Roehl, New Fairfield, CT (US); Howard N. Smallowitz, Austin, TX (US); George E. Stark, Lakeway, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 48 days.

(21) Appl. No.: 14/592,938

(22) Filed: Jan. 9, 2015

(51) Int. Cl.
G06F 11/00 (2006.01)
H04L 29/06 (2006.01)
H04L 12/26 (2006.01)

(52) U.S. Cl.
CPC ............ *H04L 63/1433* (2013.01); *H04L 43/10* (2013.01)

(58) Field of Classification Search
CPC .............................. H04L 43/10; H04L 63/1433
USPC ....................................... 726/1, 3, 22, 23, 25
See application file for complete search history.

(56) References Cited

U.S. PATENT DOCUMENTS 5,202,122 A * 4/1993 Graves ................... A23L 1/2126 424/725
5,304,374 A * 4/1994 Graves ................... A23L 1/2126 424/725
8,370,947 B2 2/2013 Zaitsev et al.
2006/0252600 A1 * 11/2006 Grogan ................... A63B 22/00 482/8
2007/0073555 A1 * 3/2007 Buist ..................... G06F 19/322 705/2
2007/0143851 A1 6/2007 Nicodemus et al.
2008/0189788 A1 * 8/2008 Bahl ..................... G06F 21/577 726/25
2008/0201780 A1 * 8/2008 Khan ..................... G06F 21/577 726/25
2009/0053340 A1 * 2/2009 Crosbie ................. A61K 36/81 424/777

(Continued)

FOREIGN PATENT DOCUMENTS

WO 0193037 12/2001
WO 2012166113 12/2012

OTHER PUBLICATIONS

Lee et al.,"A Framework for Constructing Features and Models for Intrusion Detection Systems", ACM Transactions on Information and System Security, vol. 3, No. 4, Nov. 2000, 35 pages.

(Continued)

*Primary Examiner* — Haresh N Patel
(74) *Attorney, Agent, or Firm* — William Hartwell; Andrew M. Calderon; Roberts Mlotkowski Safran & Cole, P.C.

(57) ABSTRACT

Approaches are provided for determining a risk level for server health check processing. An approach includes creating statistical process control analyzes for each of one or more servers on a network by calculating performance parameters for each of one or more servers based on historical values for one or more key process indicators of server health or vulnerability. The approach further includes collecting new values for each of the one or more key process indicators, detecting significant changes of the mean or variation in each of the one or more key process indicators, and determining a risk level for each of the one or more servers based on a number of the significant changes of the mean or variation. The approach further includes providing a health check recommendation for each of the one or more servers based on the risk level determined for each of the one or more servers.

18 Claims, 6 Drawing Sheets

(56) References Cited

U.S. PATENT DOCUMENTS

| | | | |
|---|---|---|---|
| 2009/0132284 A1* | 5/2009 | Fey | G06F 19/322 705/3 |
| 2010/0286488 A1* | 11/2010 | Cohen | G06F 19/323 600/300 |
| 2011/0106692 A1* | 5/2011 | Moore | G06Q 40/02 705/38 |
| 2012/0095802 A1* | 4/2012 | Wilberding | G06Q 10/063 705/7.28 |
| 2012/0240185 A1 | 9/2012 | Kapoor et al. | |
| 2013/0104236 A1 | 4/2013 | Ray et al. | |
| 2013/0212683 A1* | 8/2013 | Sher-Jan | G06F 21/00 726/25 |
| 2013/0227636 A1 | 8/2013 | Bettini et al. | |
| 2013/0239218 A1* | 9/2013 | Howcroft | G06F 21/57 726/25 |
| 2013/0254833 A1 | 9/2013 | Nicodemus et al. | |
| 2013/0276124 A1* | 10/2013 | Tahir | G06F 21/577 726/25 |
| 2013/0298243 A1 | 11/2013 | Kumar et al. | |
| 2014/0137190 A1* | 5/2014 | Carey | H04L 63/1433 726/3 |
| 2014/0181982 A1* | 6/2014 | Guo | G06F 21/577 726/25 |
| 2014/0359777 A1* | 12/2014 | Lam | G06F 21/577 726/25 |
| 2014/0380484 A1* | 12/2014 | Choi | G06F 21/577 726/25 |
| 2015/0074579 A1* | 3/2015 | Gladstone | G06F 3/0484 715/771 |
| 2015/0095719 A1* | 4/2015 | Namkoong | G06F 11/008 714/47.3 |
| 2015/0106867 A1* | 4/2015 | Liang | H04L 63/1433 726/1 |
| 2015/0121532 A1* | 4/2015 | Barel | G06F 21/577 726/25 |
| 2015/0200959 A1* | 7/2015 | Adam | H04L 41/50 726/25 |
| 2015/0235001 A1* | 8/2015 | Fouts | G06F 19/3431 705/2 |
| 2015/0324616 A1* | 11/2015 | Alarabi | G06F 21/88 726/25 |

OTHER PUBLICATIONS

Lei et al.,"Network Intrusion Detection Using an Improved Competitive Learning Neural Network", Proceedings of the Second Annual Conference on Communication Networks and Services Research (CNSR'04), © 2004 IEEE., 8 pages.

\* cited by examiner

DETERMINING A RISK LEVEL FOR SERVER HEALTH CHECK PROCESSING

TECHNICAL FIELD

The technical character of the present invention generally relates to server health checking, and more particularly, to systems and methods for determining a risk level for server health check processing.

BACKGROUND

Servers within a distributed network, such as a managed information technology (IT) environment, perform transactions with other servers and use resources within the system. As the servers require the use of other servers and resources, the security, operability and reliability of the servers become more important. If a server fails or has its security breached it may affect other servers and resources that were tied up in transactions with the server at the time of the server's failure. Whether a server has failed completely or the server's condition has degraded is important information to a distributed network. Thus, it is important to know the health status of each server in order to maintain the security and operability of each server.

Typically, in a distributed network, every server is health checked for vulnerabilities on a regular basis. The health checking process conventionally includes a mechanism for polling each active server with a query or script on a periodic basis. The query or script returns results indicating such things as whether a server of the distributed network is operating, whether aspects of the server are operational, and the like. Based on the results of the query or script, the malfunctioning or at risk servers can be remediated, and the server put back online once they regain operability or secure status. However, this process of checking every server for health or vulnerabilities requires significant effort and time to periodically perform the health checks and analyze the results.

One approach to overcome this labor intensive process is an automated check system having a server manager that is configured to determine if a health check is required for a particular server based on one or more predefined policies. For example, a health check may be triggered by a policy that requires a health check be performed after a period of time has elapsed. In this case, the expiration of the period of time specified by an interval parameter will trigger a health check for a server. On the other hand, if a health check is not triggered, the automated check system continues in a standby state waiting for a triggering event defined by a policy to occur regarding a particular server.

However, such a policy based approach does not consider the actual risk of a server being unhealthy or vulnerable. Instead, such an approach utilizes generic triggers, such as an expiration of a period of time or capacity of a hard drive, in order to perform health checking in a routine manner without deference to the actual risk of a server being unhealthy or vulnerable. In such an approach, health checks are still performed on servers at "low risk" for being unhealthy or vulnerable. Execution of these health checks on "low risk" servers takes away effort from incident resolution, project implementation, and new business opportunities. Further, and potentially worse, a server at high risk of failure may not be checked at all, because not enough time has elapsed to trigger a health check, leaving the system vulnerable to a potentially catastrophic failure or security breach.

SUMMARY

In a first aspect of the invention, a method is provided for that includes collecting data regarding one or more servers on a network. The data includes historical values for one or more key process indicators for each of the one or more servers. The method further includes creating statistical process control analyses for each of the one or more key performance indicators on each of one or more servers. The statistical process control analyses define the performance parameters for each of the one or more key performance indicators. The performance parameters are calculated based on the data collected. The method further includes collecting new values for each of the one or more key performance indicators for each of the one or more servers. The method further includes detecting significant changes of mean or variation in each of the one or more key performance indicators based on the collected new values and the defined performance parameters. The method further includes determining a risk level for each of the one or more servers based on a number of the significant changes of the mean or variation detected in each of the one or more key performance indicators. The method further includes providing a health check recommendation for each of the one or more servers based on the risk level determined for each of the one or more servers.

In another aspect of the invention, a computer program product is provided for performing an event-driven server health check. The computer program product includes a computer readable storage medium having program instructions embodied therewith. The computer readable storage medium is not a transitory signal per se, and the program instructions are readable by a computing device to cause the computing device to perform a method that includes creating statistical process control analyses for each of one or more servers on a network by calculating performance parameters for each of one or more servers based on historical values for one or more key process indicators of server health or vulnerability. The method further includes collecting new values for each of the one or more key process indicators for each of the one or more servers. The method further includes detecting significant changes of mean or variation in each of the one or more key process indicators based on the collected new values and the calculated performance parameters. The method further includes determining a risk level for each of the one or more servers based on a number of the significant changes of the mean or variation detected in each of the one or more key process indicators. The method further includes providing a health check recommendation for each of the one or more servers based on the risk level determined for each of the one or more servers.

In a further aspect of the invention, a system is provided for that includes a CPU, a computer readable memory and a computer readable storage medium. The system further includes program instructions to create statistical process control analyses for each of one or more servers on a network by calculating performance parameters for each of one or more servers based on historical values for one or more key process indicators of server health or vulnerability. The system further includes program instructions to collect new values for each of the one or more key process indicators for each of the one or more servers. The system further includes program instructions to detect significant changes of mean or variation in each of the one or more key process indicators based on the collected new values and the calculated performance parameters. The system further includes program instructions to determine a risk level for each of the one or more servers based on a number of the significant changes of the mean or variation detected in each of the one or more key process indicators. The system further includes program instructions to provide a health check recommendation for each of the one or more servers based on the risk level determined for each of the one or more servers. The program instructions are stored on the computer readable storage medium for execution by the CPU via the computer readable memory.

In another aspect of the invention, a method is provided for deploying a system for performing an event-driven server health check for a subscriber in a computing environment. The method comprises providing a computer infrastructure being operable to perform any combination of the method steps and/or any combination of functionality of the computing environment disclosed and/or recited herein.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
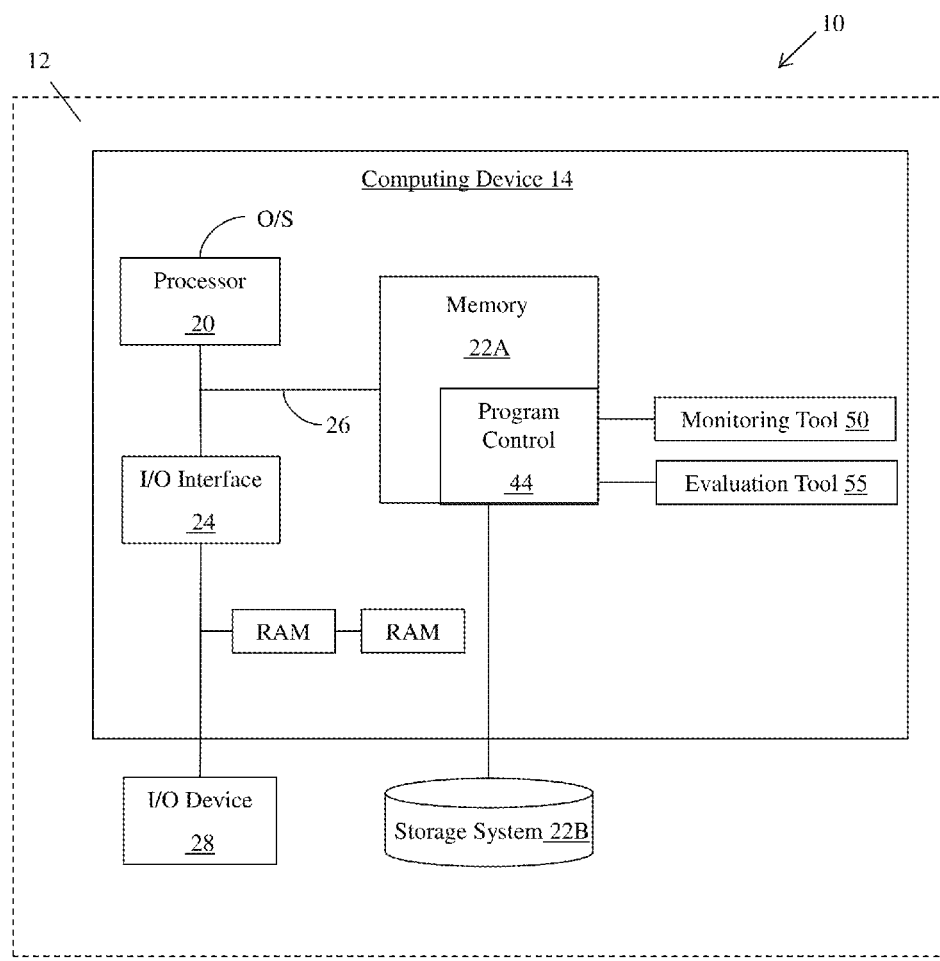
FIG. 1 shows an illustrative environment for implementing the steps in accordance with aspects of the invention.

The technical character of the present invention generally relates to server health checking, and more particularly, to systems and methods for determining a risk level for server health check processing. More specifically, the present invention provides systems and methods that implement technical features such as monitoring and evaluation hardware and/or software that interoperate to collect key performance indicator of server health or vulnerability from each server within a network, analyze the key performance indicator for significant changes (e.g., signals) using statistical process control to determine a risk level associated with each server, determine whether a health check should be performed on each server based on the determined risk level for each server, and update the statistical process control base on the outcome of the health check. In embodiments, the key performance indicators are: (1) central processing unit utilization; (2) the number of changed user identifications, (3) the number of changed passwords or password resets, (4) the amount of data transferred per second of operation, and (5) the number of system changes implemented such as a number of patches applied. By tracking each of these key performance indicators using statistical process control, when a significant change from a normal process is identified for one or more of the key performance indicators for a particular server, then a health check may be executed based on a risk level (e.g., "high" risk) of the particular server. However, if no significant change is identified for any of the key performance indicators, then there is no reason to health check the particular "low risk" server.

In embodiments, a significant change in the one or more key performance indicators may be defined through statistical process control for each key performance indicator of interest using regularly collected data from automated systems and statistical process control defined performance parameters (e.g., normal performance parameters). When one or more of the key performance indicators demonstrate a significant change from the normal performance parameters, that particular server is added to a health check list for evaluation. Once the evaluation occurs, if there is a significant finding in the evaluation (e.g., the particular server is experiencing problems), the server can be remediated and put back into production, and there is no change implemented for the normal performance parameters set for the key performance indicators. However, if there is no significant finding in the evaluation (e.g., the health check has identified no actionable issues with the server), the normal performance parameters may be updated based on the type of signal identified. For example, if the key performance variable has a run of eight measurements above a current average value without significant finding, a new average value is calculated based on the eight measured values (e.g., a type of signal identified).

The advantage of the aforementioned technical solution of using statistical process control to identify when to perform a health check on a server is that it will eliminate the technical problem of having health checks performed on servers that are "low risk" for incidents, (e.g., the servers have not had a significant change to them over time). For example, implementations of the present invention provide a technical contribution over conventional health check systems and methods because the technical features of the present invention interoperate to reduce the amount of effort and time spent performing health checks on "low risk" servers of a network without increasing the risk of malfunction or security incidents to the servers and network. Additionally, servers at risk of failure or security breach will be detected and health checks performed without the need to wait for a scheduled health check.

Although, the present invention is described hereafter with regard to exemplary systems, methods, and/or computer program products it should be understood that other implementations are also contemplated by the present invention as described herein. For example, other devices, systems, appliances, processes, and/or computer program products according to embodiments of the invention will be or become apparent to one with skill in the art upon review of the following drawings and detailed description. It is intended that all such additional other devices, systems, appliances, processes, and/or computer program products be included within this description and within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment, (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., graphic user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls a monitoring tool 50 and/or an evaluation tool 55, which performs processes described herein. The monitoring tool 50 and/or an evaluation tool 55 can be implemented as one or more program code in program control 44 stored in memory 22A as separate or combined modules. Additionally, the monitoring tool 50 and/or an evaluation tool 55 may be implemented as separate dedicated processors or a single or several processors to provide the function of the monitoring tool 50 and/or an evaluation tool 55. While executing the computer program code, the processor 20 can read and/or write data to/from memory 22A, storage system 22B, and/or I/O interface 24. The program code executes the processes of the invention. The bus 26 provides a communications link between each of the components in computing device 14

By way of example, the monitoring tool 50 may be configured to provide the functionality of collecting key performance indicators of server health or vulnerability from each server within a network, analyzing the key performance indicators for significant changes from normal performance parameters to determine a risk level associated with each server, and determining whether a health check should be performed on each server based on the determined risk level for each server. In additional embodiments, the monitoring tool 50 may be further configured such that when one or more of the key performance indicators demonstrate a significant change from the normal performance parameters, that particular server is added to a health check list for evaluation. Once the evaluation occurs, if there is a significant finding in the evaluation, (e.g., the particular server is experiencing problems), the normal performance parameters set for the key performance indicators may remain constant. However, if there is no significant finding in the evaluation, (e.g., the particular server is not experiencing any problems), the normal performance parameters set for the key performance indicators may be updated by the monitoring tool 50.

By way of example, the evaluating tool 55 may be configured to maintain a health check list for each of the one or more servers on a network, perform an evaluation of the one or more servers based on recommendations of performing health checks and the health check list, and provide feedback regarding the evaluation to the monitoring tool 50. In embodiments, the feedback may indicate whether an issue was discovered or not with the server, or the feedback may also include details as to the issue discovered and whether it was attributable to one or more of the key performance indicators having a significant change from the normal performance parameters.

The computing device 14 can comprise any general purpose computing article of manufacture capable of executing computer program code installed thereon (e.g., a personal computer, a mobile device, a server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
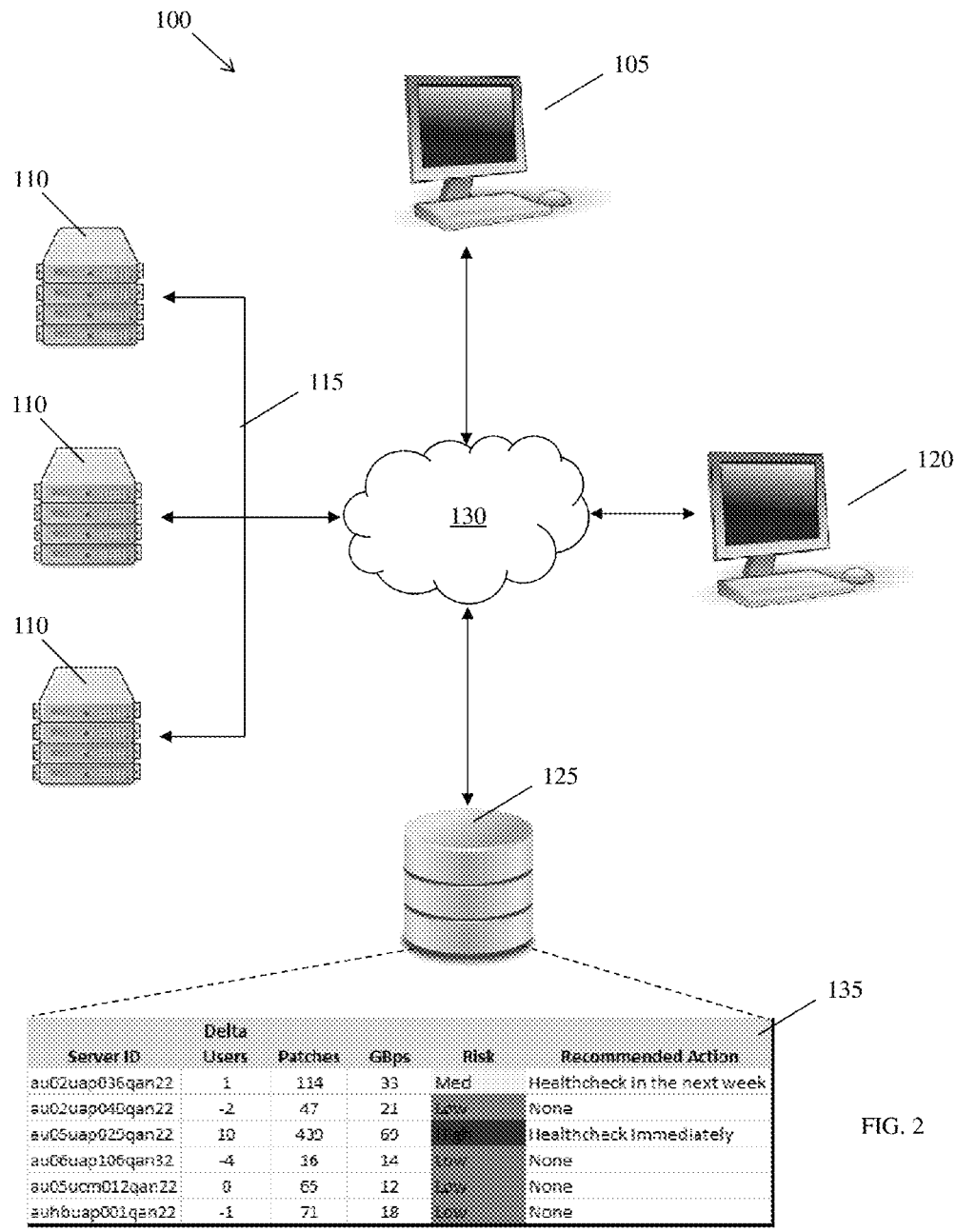
FIG. 2 shows a high level architecture for implementing processes in accordance with aspects of the invention.

FIG. 2 is a high level architecture for implementing processes in accordance with aspects of the present invention. More specifically, FIG. 2 depicts a health check monitoring system 100 comprising monitoring tool 105 (e.g., monitoring tool 50 described with respect to FIG. 1) in communication with one or more servers 110 on a network 115, a evaluation tool 120 (e.g., evaluation tool 55 described with respect to FIG. 1), and one or more databases 125 (e.g., a storage system 22B as described with respect to FIG. 1) via a network 130 (e.g., the Internet, a local area network, a wide area network and/or a wireless network). The one or more servers 110 on the network 115 may be, for example, a computing device comprising a computer program that provides services to other computer programs (and their users) in the same or other computing device(s) via a distributed network.

In embodiments, the monitoring tool 105 may be configured to communicate with the one or more servers 110 on the network 115 in order to monitor and collect data from the one or more servers 110. For example, the monitoring tool 105 may be configured to collect key process indicators of server health or vulnerability (e.g., user identification changes, password resets, data transfer rates, and system changes) from each of the one or more servers 110. The monitoring tool may be further configured to perform statistical process control analyses using the key process indicators as variables to maintain the performance of each of the one or more servers 110 within a desired operating status on the network 115, as described in detail hereafter with respect to FIGS. 3-8. As should be understood, the statistical process control analyses implemented by the present invention for each of the one or more servers enables automation by which a small staff of operating personnel can operate a complex information technology infrastructure from a centralized location.

In embodiments, the monitoring tool 105 may be configured to communicate with the evaluation tool 120 in order to initiate a health check (e.g., have a particular server added to a health check list for evaluation) for any of the one or more servers 110 to maintain the performance of the one or more servers 110 within a desired operating status on the network 115. Additionally, the monitoring tool 105 may be configured to communicate with the evaluation tool 120 in order to obtain feedback from the evaluation tool 120 regarding any health check performed on the one or more of the servers 110. For example, once the evaluation tool 120 evaluates a particular server via a health check, the monitoring tool 105 may be configured to retrieve feedback from the evaluation tool 120, and maintain normal performance parameters set for the key process indicators within the statistical process control based on the retrieved feedback.

In embodiments, the evaluation tool 120 may be configured to communicate with the one or more servers 110 on the network 115 in order to evaluate and perform a health check on the one or more servers 110. For example, the evaluation tool 120 may be configured to run a script that performs one or more of the following: checks the uptime of the server, checks pending reboots, verifies existence of files and web sites within a directory, checks role configurations, reapplies security systems, checks user access based on permissions, checks anonymous access, synchronizes the database, obtains central processing unit information such as transfer rates, obtains memory utilization, obtains various drive utilization, verify name conventions, check load balancing, check event logs, check network connections, etc. In addition, the evaluation tool 120 may be configured to individually, or in conjunction with user oversight and/or input received from other diagnostic tools, trouble shoot, identify, and/or repair any issues with the one or more servers 110 based on the data obtain from running the aforementioned script.

In embodiments, the monitoring tool 105 may be configured to communicate with the one or more databases 125 in order to store and retrieve data for each of the one or more servers 110. For example, the monitoring tool 105 may be configured to store and retrieve server identifications, the key process indicators for each server, determined health or vulnerability risk levels for each server, and any recommended action proposed for each server, as shown in table 135 and described in detail hereafter with respect to FIGS. 3-8.

Figure 3:
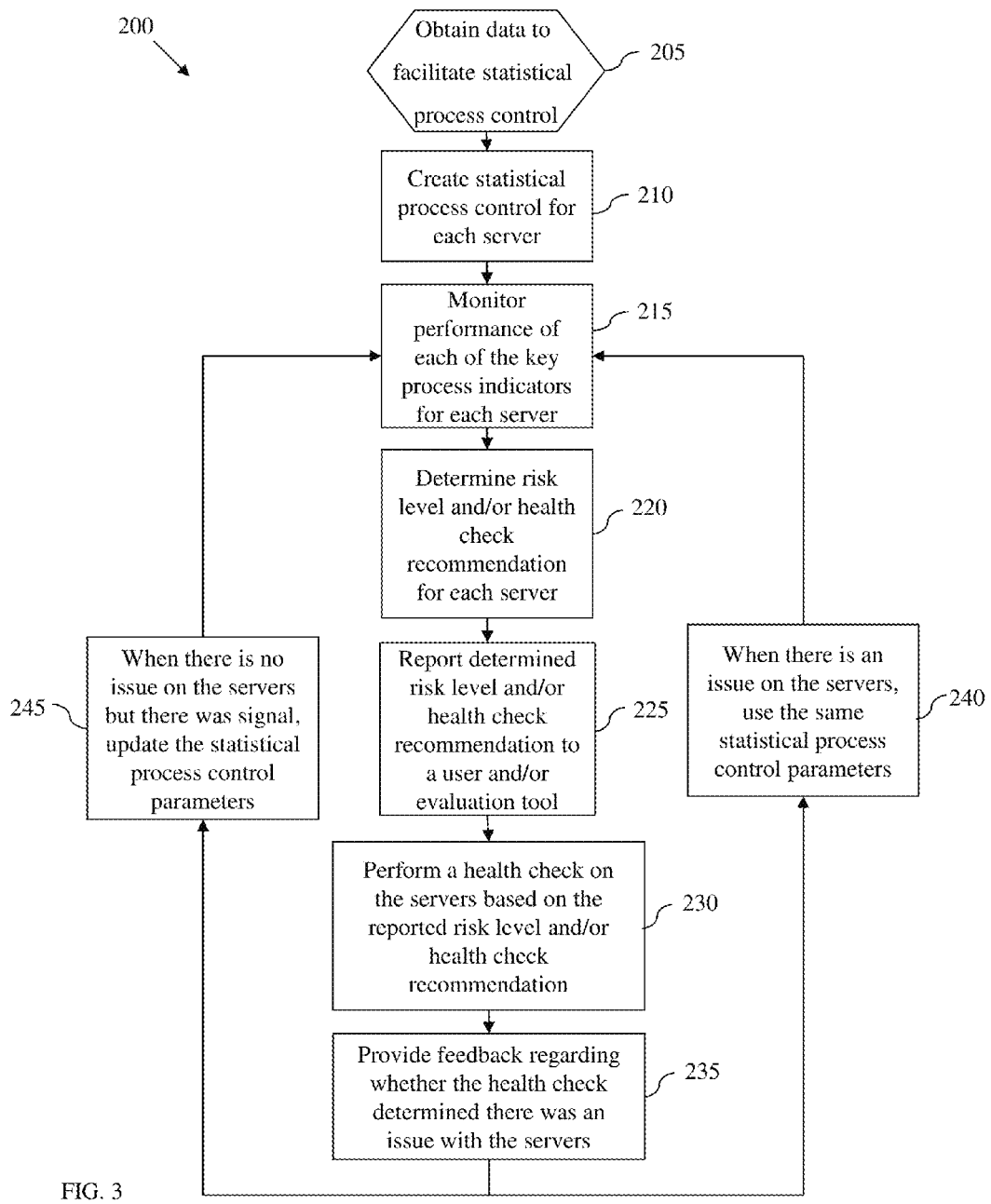
FIG. 3 shows an exemplary flow in accordance with aspects of the invention.
Figure 8:
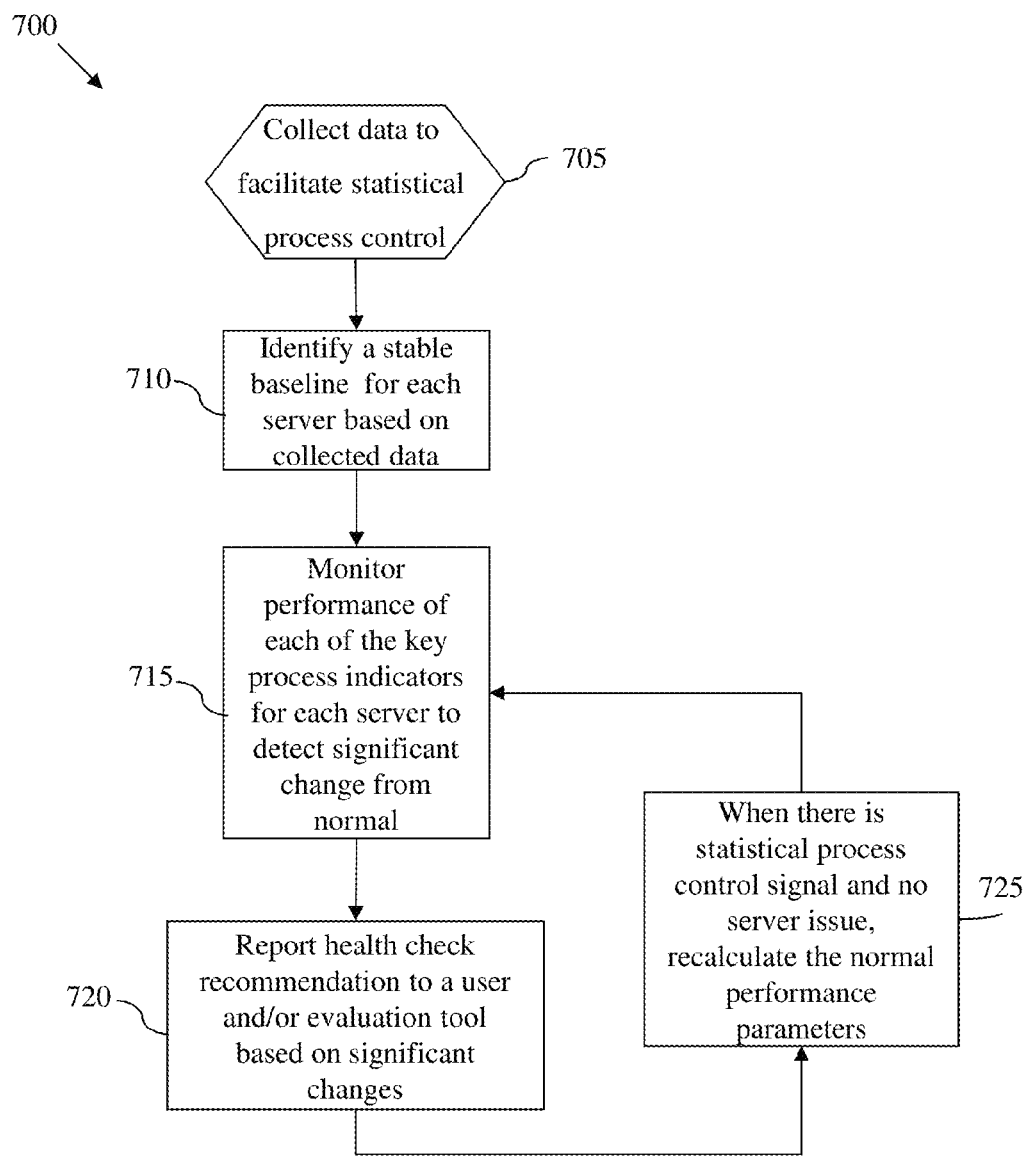
FIG. 8 shows an exemplary flow in accordance with aspects of the invention.

FIGS. 3 and 8 show exemplary flows for performing aspects of the present invention. The steps of FIGS. 3 and 8 may be implemented in the environment of FIG. 1, for example. As noted above, the flowchart(s) illustrate the architecture, functionality, and operation of possible implementations of systems, methods, and computer program products as already described herein in accordance with the various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 3 is a flow diagram illustrating a process 200 for an event-driven server health check approach in accordance with aspects of the present invention. At step 205, data is obtained to facilitate statistical process control of one or more servers on a network. In embodiments, the data may be obtained from any number of various actions or sources including retrieving data from a profile manager for each server, running scripts to monitor and collect key process indicators of server health or vulnerability (e.g., user identification changes, pass word resets, data transfer rates, and system changes such as system patches) from each of the one or more servers, retrieving historical data from a database (e.g., database 125 as described with respect to FIG. 2), and/or obtaining data, such as feedback data, from a health check evaluation tool (e.g., evaluation tool 120 as described with respect to FIG. 2).

To this end, in embodiments, a monitoring tool (e.g., the monitoring tool 105 as described with respect to FIG. 2) is configured to generate a list of each server including a unique server identification for each server, key process indicators of server health or vulnerability that a user is interested in monitoring and using for statistical process control analysis, newly obtained or concurrent data points for each of the process indicators for each of the one or more servers, historical data points for each of the process indicators for each of the one or more servers, and any previous feedback, health or vulnerability risk levels, and/or recommended actions determined or proposed for each of the one or more servers. The monitoring tool may be further configured to store and retrieve the generated list for each server and the data stored therein from a database (e.g., the database 125 as described with respect to FIG. 2).

In accordance with aspects of the present invention, the key process indicators are user assigned and should be measurable variables that can take on any value within a given range, although they are often measured at specific intervals (e.g., average daily transfer rates for a server are measurable variables since the transfer rates can take any value between 0 and a maximum transfer rate for server, such as 300 GBps). Additionally, the measurements of the key process indicators should be statistically in control in order for statistical process control of the one or more servers on the network to function properly. To be in control means that the variable (e.g., transfer rate) merely contains natural random variation, not assignable variation. The statistical control of a variable could be tested by using a control chart to determine whether there is natural random variation around a mean line, as should be understood by those of ordinary skill in the art.

At step 210, a statistical process control analysis is created with respect to each of the one or more servers on the network. As should be understood, statistical process control is a statistical process to monitor and control a process. For example, in the present invention, statistical process control is used to monitor key process indicators of server health or vulnerability for each of the one or more servers to control and optimize the process of performing health checks on each of the one or more servers. The application of the statistical process control in accordance with aspects of the present invention comprises three main phases including: (i) initial creation of statistical process control analysis using calculated means and control limits for each of the key process indicators based on historical data points for each of the one or more servers (step 210); (2) monitoring performance of each of the key process indicators assisted by use of control charts to detect significant changes of mean or variation (step 215); and (3) adjusting or modeling the statistical process control using updated means and control limits for each of the key process indicators based on newly obtained or concurrent data points for each of the one or more servers (step 240).

In embodiments, the statistical process control analysis is initially created or established by defining normal performance parameters for each of the key process indicators for each of the one or more servers. For example, the monitoring tool (e.g., the monitoring tool 105 as described with respect to FIG. 2) is configured to define normal performance parameters for each of the key process indicators using historical data points (e.g., values for transfer rates in MBps) collected for the key process indicators in step 205. The normal performance parameters can be defined as a mean or average ($\bar{\chi}$ or x-bar) of the values for each of the key process indicators and a range of reasonable variation around the mean or average of the values. The reasonable range is bounded by control limits such that an upper control limit (UCL) indicates a maximum value that is statistically reasonable, and a lower control limit (LCL) indicates a minimum reasonable value. The upper and lower control limits are calculated from equations based on distribution-independent approximations of "n" standard deviations (e.g., three standard deviations) from the mean or average of the values. For example, three sigma control limits consider measurements within three standard deviations of the mean of the values or x-bar values to be "natural variation."

In embodiments, the initially creation or establishment of the statistical process control analysis may further include creating one or more control charts for each of the key process indicators. For example, the monitoring tool (e.g., the monitoring tool 105 as described with respect to FIG. 2) is configured to generate control charts by plotting the historical data points in a chart with the defined normal performance parameters for each of the key process indicators. In embodiments, the control charts may be created and stored on one or more databases (e.g., the databases 125 as described with respect to FIG. 2).

Figure 4:
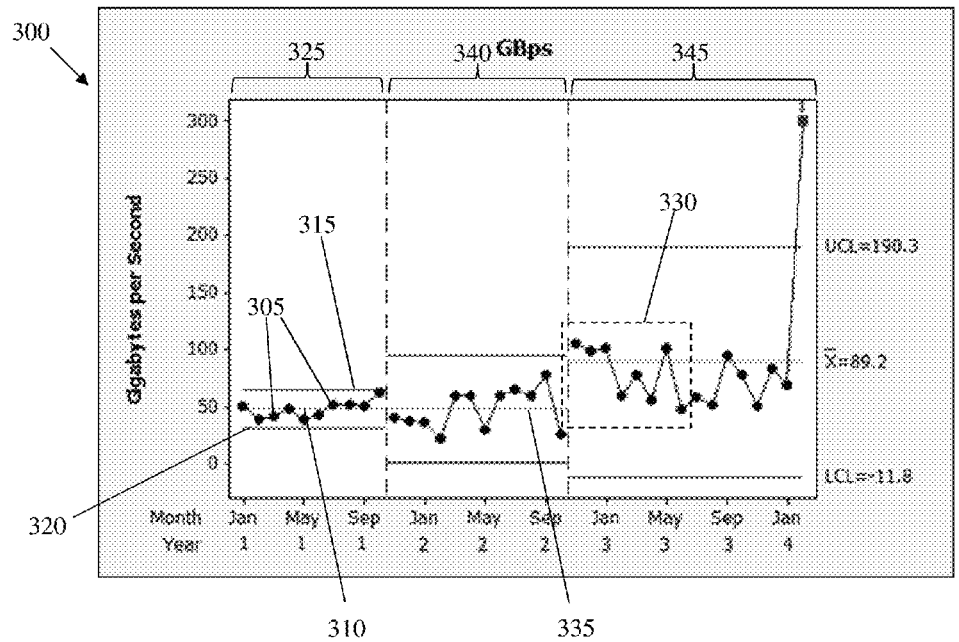
FIGS. 4-7 show visual representations of examples of operation in accordance with aspects of the invention.

In embodiments in which the key process indicators are continuous or nearly continuous (e.g., transfer rates of the servers), the historical data points may be averaged based on a sampling of measurements over a period of time and plotted in an x-bar r chart with defined normal performance parameters for each of the key process indicators. An x-bar r chart is a line graph with each plotted point being the x-bar value for a sample of measurements. FIG. 4 shows an x-bar r chart 300 generated in accordance with aspects of the present invention for a rate of transfer (e.g., a key process indicator) for a particular server. Specifically, the x-bar r chart 300 is initially created by plotting historical transfer rates 305 (x-bar values) for a predetermined number of months (a sample of measurements). The historical transfer rates 305 are then used to define the normal performance parameters including mean 310, Upper Control Limit (UCL) 315, and Lower Control Limit (LCL) 320 for a first phase 325 of the statistical process control. As should be understood, the number of historical transfer rates 305 used to define the normal performance parameters should be large enough such that the normal performance parameters are statistically representative of the sample size. The phases indicated in FIG. 4 by the vertical dashed lines show points in time where the normal performance parameters were updated based on analysis described in step 245 of FIG. 3. In the second phase 340 of the statistical process control analysis the mean and limit values were changed based on a non-random behavior signal from the incoming data in step 215 and the fact that no significant issue was found with the server based on this signal. In the third phase 345 of the process control analysis the mean and limit values were changed based on an eight points above the mean signal from the incoming data in step 215 and the fact that no significant issue was found on the server.

Figure 5:
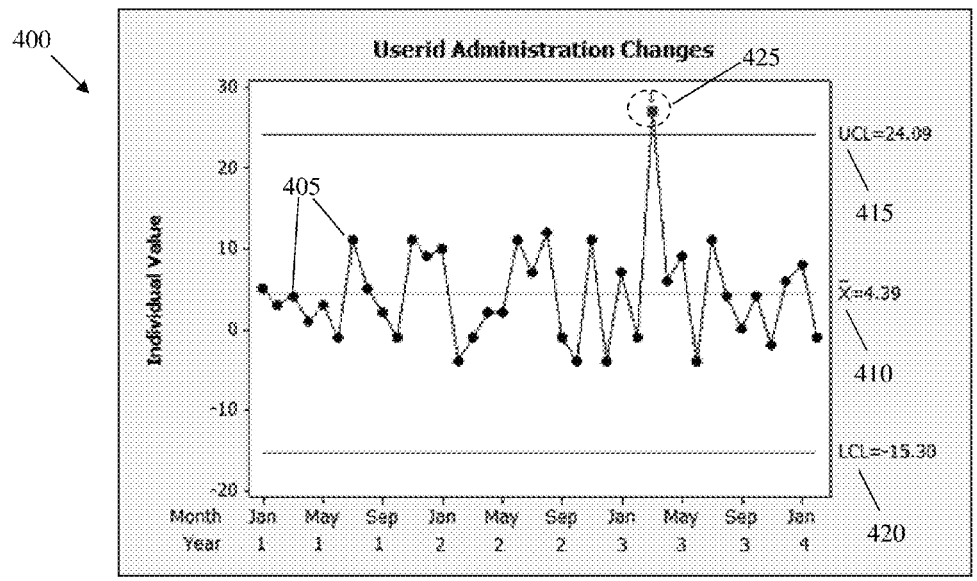

FIG. 5 shows a different x-bar r chart 400 generated in accordance with aspects of the present invention for numbers of user identification changes (e.g., a key process indicator) for a particular server. Specifically, the x-bar r chart 400 is initially created by plotting historical counts of the numbers of user identification changes 405 for a predetermined number of months (a sample of measurements). The numbers of user identification changes 405 are then used to define the normal performance parameters including mean or x-bar 410, UCL 415, and LCL 420 for a portion of the statistical process control. As should be understood, the numbers of user identification changes 405 used to define the normal performance parameters should be large enough such that the normal performance parameters are statistically representative of the sample size.

Figure 6:
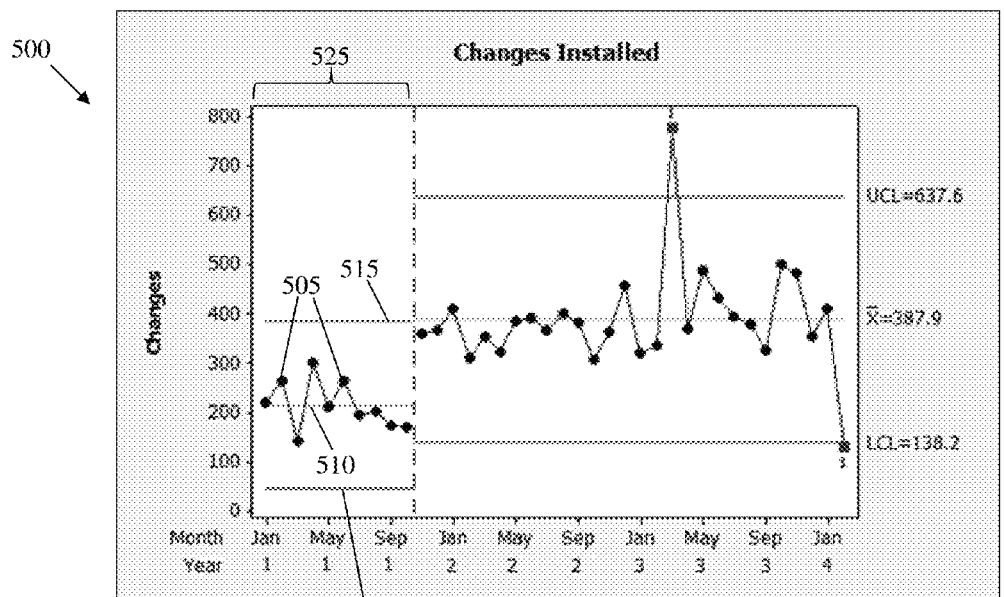

FIG. 6 shows another x-bar r chart 500 generated in accordance with aspects of the present invention for numbers of changes installed (e.g., a key process indicator) for a particular server. Specifically, the x-bar r chart 500 is initially created by plotting historical counts of the numbers of changes installed 505 for a predetermined number of months out of a year (a sample of measurements). The numbers of changes installed 505 are then used to define the normal performance parameters including mean or x-bar 510, UCL 515, and LCL 520 for a first phase 525 of the statistical process control analysis. As should be understood, the numbers of changes installed 505 used to define the normal performance parameters should be large enough such that the normal performance parameters are statistically representative of the sample size.

Accordingly, it should be understood that the normal performance parameters of the present invention are not set as mere thresholds based on expert opinion or arbitrary data points, as is the case in some conventional health check systems or processes. Instead, the technical features of the present invention allow for the normal performance parameters to be set based on real historical data values collected from the particular servers upon which they will be used to execute process control thereof.

With respect back to FIG. 3, at step 215, performance of each of the key process indicators is monitored to detect significant changes of mean or variation in each of the key process indicators. As a best practice, a subset of the Western Electric rules for statistical process control should be adopted to provide the best cost/benefit from false alerts. For example, the monitoring tool (e.g., the monitoring tool 105 as described with respect to FIG. 2) is configured to collect values for each of the key process indicators from each of the one or more servers, and with assistance from the control charts, the monitoring tool is configured to detect significant changes of mean or variation in each of the key process indicators. In embodiments, the monitoring tool is configured to plot the collected values for each of the key process indicators within the corresponding control charts and analyze the plotted values in view of the previously defined normal performance parameters to detect significant changes of mean or variation in each of the key process indicators.

The significant changes of mean or variation are abnormalities or patterns of behavior that are not likely to be the result of mere natural variation within a system or process. For example, the monitoring tool may analyze the plotted values to identify any abnormal tendency for the plotted values to be above or below the mean or x-bar. In this instance, an abnormal tendency may be defined as eight or more points in a row above or below the mean or x-bar (see, e.g., FIG. 4, which shows plotted values 330 above previously defined mean or x-bar 335). The monitoring tool may also analyze the plotted values to identify values that are outside of the control limits. In this instance, one or more points outside three sigma control limits would be an abnormality (see, e.g., FIG. 5, which shows plotted value 425 above previously defined UCL 415). The monitoring tool may also analyze the plotted values to identify any abnormal tendency for the plotted values to be in a pattern repeated over a fixed number of samples.

In this instance, an abnormal tendency may be defined as six or more points strictly increasing or decreasing without deference to the mean or control limits. Although, a number of abnormal tendencies are discussed above with respect to detecting significant changes of mean or variation, it should be understood that many more known abnormal tendencies in the art of statistical process control may be utilized in the processes described herein without departing from the spirit and scope of the present invention.

At step 220, a risk level and/or health check recommendation for each of the one or more servers is determined based on the monitored performance of each of the key process indicators and any detected significant changes of mean or variation in each of the key process indicators. For example, the monitoring tool (e.g., the monitoring tool 105 as described with respect to FIG. 2) is configured to track and analyze each of the key process indicators and any detected significant changes of mean or variation in each of the key process indicators in order to determine a risk level and/or health check for each server. In embodiments, the monitoring tool may also be configured to store the determined risk level and/or associated health check recommendation in one or more databases (e.g., the one or more databases 125 as described with respect to FIG. 2).

For example, in an instance, as shown in table 135 of FIG. 2, in which three key process indicators (e.g., change in user identifications, numbers of patches installed, and transfer rates) are tracked, the monitoring tool may be configured to conclude that for: (i) a server with one of three key process indicators with a detected significant change of mean or variation there is a low level of risk for vulnerability or health concerns, and thus no health check should be performed; (ii) a server with two of three key process indicators with a detected significant change of mean or variation there is a medium level of risk for vulnerability or health concerns, and thus a health check should be performed within the next week; and (iii) a server with three of three key process indicators with a detected significant change of mean or variation there is a high level of risk for vulnerability or health concerns, and thus a health check should be performed immediately.

However, it should be understood that any number of key process indicators with a detected significant change of mean or variation may be used to determine a risk level and/or health check recommendation for the servers without departing from the spirit and scope of the present invention. For example, the monitoring tool may be configured to conclude that any detected significant change of mean or variation in any of the key process indicators results in a high level of risk for vulnerability or health concerns, and thus whenever a significant change of mean or variation in any of the key process indicators is detected, a health check should be performed immediately.

In additional or alternative embodiments, the monitoring tool may be configured to analyze the key process indicators for each server and any detected significant changes of mean or variation in each of the key process indicators in view of a server profile that is configured for each server. In embodiments, the server profiles may be set up by a user and stored on one or more databases (e.g., the databases 125 as described with respect to FIG. 2). The server profiles identify any number of pieces of information that are relevant to determining a risk level for each corresponding server. For example, each server profile may include information such as a classification of the server (e.g., proxy server, email server, mailing list server, web server, application server, etc.), a configuration database for the computing environment, an importance of the server with respect to the environment (e.g., the server may be identified as very important if the server is running critical applications, whereas the server may be classified as less important if the server is running non-critical applications), etc. Accordingly, the monitoring tool may be configured to conclude that for: (i) a non-critical server with one of three key process indicators with a detected significant change of mean or variation there is a low level of risk for vulnerability or health concerns, and thus no health check should be performed; (ii) a critical server with one of three key process indicators with a detected significant change of mean or variation there is a high level of risk for vulnerability or health concerns, and thus a health check should be performed immediately; (iii) a non-critical server with two of three key process indicators with a detected significant change of mean or variation there is a medium level of risk for vulnerability or health concerns, and thus a health check should be performed within the next twenty-four hours; and (iv) a non-critical server with three of three key process indicators with a detected significant change of mean or variation there is a high level of risk for vulnerability or health concerns, and thus a health check should be performed immediately.

However, it should be understood that any number of key process indicators with a detected significant change of mean or variation may be used in view of any additional server information to determine a risk level and/or health check recommendation for the servers without departing from the spirit and scope of the present invention. For example, the monitoring tool may be configured to conclude that any detected significant change of mean or variation in any of the key process indicators for a web server results in a high level of risk for vulnerability or health concerns, and thus whenever a significant change of mean or variation in any of the key process indicators for a web server is detected, a health check should be performed immediately.

At step 225, the determined risk level and/or health check recommendation is reported to a user and/or an evaluation tool. For example, the monitoring tool (e.g., the monitoring tool 105 as described with respect to FIG. 2) is configured to forward the determined risk level and/or health check recommendation to a user (e.g., as a part of the table 135 of FIG. 2) and/or an evaluation tool (e.g., added to a health check list for evaluation tool 120 discussed with respect to FIG. 2).

At step 230, the user and/or evaluation tool perform a health check on the one or more servers based on the reported risk level and/or health check recommendation. For example, the evaluation tool (e.g., the evaluation tool 120 as described with respect to FIG. 2) may be configured to run a script on the one or more servers that performs one or more of the following: checks the uptime of the server, checks pending reboots, verifies existence of files and web sites within a directory, checks role configurations, reapplies security systems, checks user access based on permissions, checks anonymous access, synchronizes the database, obtains central processing unit information such as transfer rates, obtains memory utilization, obtains drive utilization, verify name conventions, check load balancing, check event logs, check network connections, etc. In addition, the evaluation tool may be configured to individually, or in conjunction with user oversight and/or input received from other diagnostic tools, trouble shoot, identify, and/or repair any issues with the one or more servers based on the data obtain from running the aforementioned script.

At step 235, the user and/or evaluation tool provide feedback regarding the health check performed on the one or more servers. For example, the evaluation tool (e.g., the evaluation tool 120 as described with respect to FIG. 2) is configured to communicate whether the health check determined that there was an issue (e.g., inventory and mapping issue, server resource issue, hardware health or environment issue, server availability issue, capacity management issue, security threat issue, etc.) with the one or more servers to the monitoring tool (e.g., the monitoring tool 105 as described with respect to FIG. 2). In embodiments, the communication may simply indicate whether an issue was discovered or not, or the communication may also include details as to the issue discovered and whether it was attributable to one or more of the key process parameters having a significant change of mean or variation.

At step 240, when the health check determines that there is an issue with one or more of the servers, the statistical process control parameters remain at their current level with respect to each of the affected one or more servers on the network, and the process returns to step 215 and continues monitoring the performance of each of the key process indicators using the same statistical process control parameters. For example, the monitoring tool (e.g., the monitoring tool 105 as described with respect to FIG. 2) is configured to collect values for each of the key process indicators from each of the one or more servers, and with assistance from the control charts, the monitoring tool is configured to detect significant changes of mean or variation in each of the key process indicators.

At step 245, when the health check determines that there is no issue with one or more of the servers, yet there was a signal from the monitoring system, the system evaluates the need to change the statistical process control parameters. For example, the monitoring tool (e.g., the monitoring tool 105 as described with respect to FIG. 2) is configured to recalculate the normal performance parameters (e.g., the mean and control limits) for each key process indicator that had a significant change (either 8 points above or below the mean value, non-random behavior, or six points strictly increasing or decreasing) resulting in the recommendation and performance of a health check for the one or more servers that proved to be a false alert (i.e., the server was not at risk for a security breach or failure). Thereafter, the monitoring tool is further configured to implement the recalculated normal performance parameters in the control charts to monitor the performance of each of the key process indicators to detect subsequent significant changes of mean or variation in each of the key process indicators as describe with respect to step 215. In embodiments, the normal performance parameters are recalculated using the monitored data points (e.g., values for transfer rates in GBps) collected for the key process indicators in step 215 that are indicative of the new process (e.g., the monitored data points that resulted in the determination of a significant change of mean or variation and any points collected thereafter).

Figure 7:
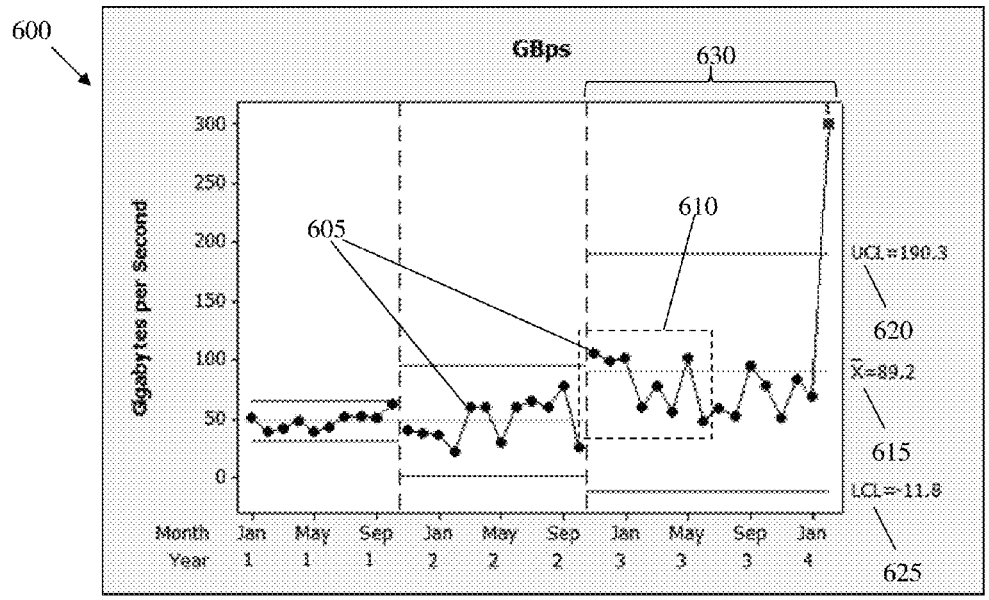

FIG. 7 shows an x-bar r chart 600 updated in accordance with aspects of the present invention for a rate of transfer (e.g., a key process indicator) for a particular server that had a significant change resulting in the recommendation and performance of a health check, which did not find an issue with the particular server. Specifically, the x-bar r chart 600 is updated by plotting the monitored data points 605 (x-bar values) for a predetermined number of months (a sample of measurements). The data points for the collected transfer rates 610 that are indicative of the new process (e.g., the eight data points above the previous mean or x-bar which indicate the significant change to a new process) are then used to define new normal performance parameters including mean or x-bar 615, UCL 620, and LCL 625 for a third phase 630 of the statistical process control. As should be understood, the number of the data points for the collected transfer rates 610 used to define the new normal performance parameters should be large enough such that the new normal performance parameters are statistically representative of the sample size.

FIG. 8 is a flow diagram illustrating a process 700 for an event-driven server security health check approach in accordance with aspects of the present invention. At step 705, data is collected to facilitate identifying a stable baseline for statistical process control of one or more servers on a network. For example, the monitoring tool (e.g., the monitoring tool 105 as described with respect to FIG. 2) is configured to collect the data from each of the servers by running scripts to monitor and collect key process indicators of security risk or compromise of each of the one or more servers. In embodiments, the key process indicators of security risk or compromise of each of the one or more servers may be selected as user identification changes, pass word resets (e.g., large swings in user identification changes or password resets provide additional risk of security health check issues), data transfer rates (e.g., when transfer rates exceed thresholds, there may be a denial of service attack), and system changes such as system patches (e.g., change installs that exceed the normal behavior of a server provide additional risk of security health check issues).

At step 710, a stable baseline is identified for each of the key process indicators (e.g., user identification changes, pass word resets, data transfer rates, and system changes) for each of the one or more servers. In embodiments, the stable baseline is identified by defining normal performance parameters for each of the key process indicators for each of the one or more servers. For example, the monitoring tool (e.g., the monitoring tool 105 as described with respect to FIG. 2) is configured to define normal performance parameters as a mean or average (or x-bar) of the values for each of the key process indicators and a range of reasonable variation around the mean or average of the values. The reasonable range is bounded by control limits such that a UCL indicates a maximum value that is statistically reasonable, and a LCL indicates a minimum reasonable value. As should be understood, the data set collected and used to define the normal performance parameters should be large enough (e.g., at least 15 data points) such that the normal performance parameters are statistically representative of the sample size.

At step 715, performance of each of the key process indicators is monitored to detect significant changes of mean or variation in each of the key process indicators. For example, the monitoring tool (e.g., the monitoring tool 105 as described with respect to FIG. 2) is configured to collect values for each of the key process indicators from each of the one or more servers, and with assistance from the defined normal performance parameters (e.g., using control charts as described above with reference to FIG. 3), the monitoring tool is configured to detect significant changes of mean or variation in each of the key process indicators. In embodiments, the significant changes of mean or variation are abnormalities or patterns of behavior that are not likely to be the result of mere natural variation within a system or process. For example, an abnormality or pattern of behavior may be defined as eight or more points in a row above or below the mean or x-bar, one or more points outside three sigma (e.g., three standard deviations) control limits, and six or more points strictly increasing or decreasing without deference to the mean or control limits. Detection of a significant change in any of the key process indicators from the established normal performance parameters can signal a risk of a server being vulnerable or compromised.

At step 720, a health check recommendation is reported to a user and/or an evaluation tool based on a number of the key process indicators that show significant change of mean or variation (e.g., an exception from the defined normal performance parameters). For example, the monitoring tool (e.g., the monitoring tool 105 as described with respect to FIG. 2) is configured to report a health check recommendation to a user (e.g., as a part of the table 135 of FIG. 2) and/or an evaluation tool (e.g., added to a health check list for evaluation tool 120 discussed with respect to FIG. 2). In embodiments, the monitoring tool may be configured to conclude that for: (i) a server with one of the four key process indicators with a detected significant change of mean or variation there is a low level of risk of a server being vulnerable or compromised, and thus no health check may be reported; (ii) a server with two of the four key process indicators with a detected significant change of mean or variation there is a medium level of risk of a server being vulnerable or compromised, and thus a health check may be recommended to be performed within the next week; (iii) a server with three of the four key process indicators with a detected significant change of mean or variation there is a high level of risk of a server being vulnerable or compromised, and thus a health check may be recommended to be performed within the next twenty-four hours; and (iv) a server with four of four key process indicators with a detected significant change of mean or variation there is a very high level of risk of a server being vulnerable or compromised, and thus a health check should be performed immediately.

In embodiments, the user and/or evaluation tool perform a health check on the one or more servers based on the reported health check recommendation, and subsequently provide feedback regarding the health check performed on the one or more servers. For example, the evaluation tool (e.g., the evaluation tool 120 as described with respect to FIG. 2) is configured to communicate whether the health check determined that there was an issue (e.g., inventory and mapping issue, server resource issue, hardware health or environment issue, server availability issue, capacity management issue, security threat issue, etc.) with the one or more servers to the monitoring tool (e.g., the monitoring tool 105 as described with respect to FIG. 2). In embodiments, the communication may simply indicate whether an issue was discovered or not, or the communication may also include details as to the issue discovered and whether it was attributable to one or more of the key process parameters having a significant change of mean or variation.

At step 725, when the health check determines that there is no issue with one or more of the servers that had a key process indicator identify an abnormal behavior, the normal performance parameters are recalculated with respect to each of the affected one or more servers on the network, and the process returns to step 715 and continues monitoring the performance of each of the key process indicators using the recalculated normal performance parameters. For example, the monitoring tool (e.g., the monitoring tool 105 as described with respect to FIG. 2) is configured to recalculate the normal performance parameters (e.g., the mean and control limits) for each key process indicator that had a significant change resulting in the recommendation and performance of a health check for the one or more servers. Thereafter, the monitoring tool is further configured to implement the recalculated normal performance parameters to monitor the performance of each of the key process indicators to detect subsequent significant changes of mean or variation in each of the key process indicators as describe with respect to step 715. In embodiments, the normal performance parameters are recalculated using the monitored data points collected for the key process indicators in step 715 that are indicative of the new process (e.g., the monitored data points that resulted in the determination of a significant change of mean or variation and any points collected thereafter).

The advantage of the aforementioned processes of using statistical process control to identify when to perform a health check on a server is that it will eliminate the technical problem of having health checks performed on servers that are "low risk" for incidents (e.g., the servers have not had a significant change to them over time). For example, implementations of the present invention provide a technical contribution over conventional health check systems and methods because the technical features of the present invention interoperate to reduce the amount of effort and time spent performing health checks on "low risk" servers of a network without increasing the risk of malfunction or security incidents to the servers and network.

In embodiments, the invention provides a method that performs the process of the invention on a subscription, advertising, and/or fee basis. That is, a service provider could offer to provide the data collection, monitoring performance of one or more servers, and health check recommendation functionality on a network. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for collecting data, monitoring performance of one or more servers, and recommending a health check on a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure having computer executable code tangibly embodied on a computer readable storage medium having programming instructions configured to:
   collect data regarding one or more servers on a network, wherein the data includes historical values for one or more key process indicators for each of the one or more servers;

create statistical process control analyses for each of the one or more key process indicators on each of the one or more servers by defining performance parameters for each of the one or more key process indicators, wherein the performance parameters are calculated based on the data collected;

collect new values for each of the one or more key process indicators for each of the one or more servers;

detect significant changes of mean or variation in each of the one or more key process indicators based on the collected new values and the defined performance parameters;

determine, by a processor, a risk level for each of the one or more servers based on a number of the significant changes of the mean or variation detected in each of the one or more key process indicators; and provide a health check recommendation for each of the one or more servers based on the risk level determined for each of the one or more servers, wherein the programming instructions are further configured to receive feedback regarding a health check performed in accordance with the health check recommendation for each of the one or more servers, and when the health check determines that there is not an issue with the one or more of the servers, the performance parameters are updated.

2. The method of claim 1, wherein:
the key process indicators are statistically in control; and
the performance parameters are defined as a mean of the historical values for each the one or more key process indicators and a range of reasonable variation around the mean.

3. The method of claim 2, wherein the range of reasonable variation around the mean is bounded by control limits comprising an upper control limit (UCL) that indicates a maximum value that is statistically reasonable and a lower control limit (LCL) that indicates a minimum value that is statistically reasonable.

4. The method of claim 3, wherein the UCL and the LCL are calculated from equations based on distribution-independent approximations of "n" standard deviation from the mean or average of the values.

5. The method of claim 4, wherein the number "n" is one, two, or three.

6. The method of claim 4, wherein the creating the statistical process control for each of the one or more servers comprises creating one or more control charts for each of the one or more key process indicators.

7. The method of claim 6, wherein the detecting the significant changes of the mean or variation comprises plotting the new values for each of the one or more key process indicators within the one or more control charts, and analyzing the plotted new values in view of the performance parameters to detect the significant changes of the mean or variation in each of the key process indicators.

8. The method of claim 7, wherein the significant changes of the mean or variation are defined as eight or more data points in a row above or below the mean, non-random behavior, one or more data points outside the LCL or the UCL, and six or more data points strictly increasing or decreasing without deference to the mean, the LCL, or the UCL.

9. The method of claim 1, wherein the key process indicators comprise a number of user identification changes within a predefined time period, a number of pass word resets within a predefined time period, data transfer rates within a predefined time period, and a number of system changes within a predefined time period.

10. The method of claim 1, wherein the updating the performance parameters comprises redefining the performance parameters using at least the collected new values that indicated the significant changes of the mean or variation.

11. The method of claim 1, wherein an information technology service management team at least one of creates, maintains, deploys and supports the computer infrastructure.

12. A computer program product for performing an event-driven server health check, the computer program product comprising a computer readable storage medium having program instructions embodied therewith, wherein the computer readable storage medium is not a transitory signal per se, and the program instructions are readable by a computing device to cause the computing device to perform a method comprising:

creating statistical process control analyses for each of one or more servers on a network by calculating performance parameters for each of one or more servers based on historical values for one or more key process indicators of server health or vulnerability;

collecting new values for each of the one or more key process indicators for each of the one or more servers;

detecting significant changes of mean or variation in each of the one or more key process indicators based on the collected new values and the calculated performance parameters;

determining, by the computing device, a risk level for each of the one or more servers based on a number of the significant changes of the mean or variation detected in each of the one or more key process indicators; and providing a health check recommendation for each of the one or more servers based on the risk level determined for each of the one or more servers, wherein the programming instructions are further configured to receive feedback regarding a health check performed in accordance with the health check recommendation for each of the one or more servers, and when the health check determines that there is not an issue with the one or more of the servers, the performance parameters are updated.

13. The computer program product of claim 12, wherein the key process indicators comprise a number of user identification changes within a predefined time period, a number of pass word resets within a predefined time period, data transfer rates within a predefined time period, and a number of system changes within a predefined time period.

14. The computer program product of claim 12, wherein the updating the performance parameters comprises recalculating the performance parameters using at least the collected new values that indicated the significant changes of the mean or variation.

15. A system comprising:
a CPU, a computer readable memory and a computer readable storage medium memory;
program instructions to create statistical process control for each of one or more servers on a network by calculating performance parameters for each of one or more servers based on historical values for one or more key process indicators of server health or vulnerability;
program instructions to collect new values for each of the one or more key process indicators for each of the one or more servers;
program instructions to detect significant changes of mean or variation in each of the one or more key process indicators based on the collected new values and the calculated performance parameters;

program instructions to determine, by the CPU, a risk level for each of the one or more servers based on a number of the significant changes of the mean or variation detected in each of the one or more key process indicators; and program instructions to provide a health check recommendation for each of the one or more servers based on the risk level determined for each of the one or more servers, wherein the program instructions are stored on the computer readable storage memory for execution by the CPU via the computer readable memory, further comprising program instructions to receive feedback regarding a health check performed in accordance with the health check recommendation for each of the one or more servers; and program instructions to update the performance parameters when the health check determines that there is no issue with the one or more of the servers.

16. The system of claim 15, wherein the key process indicators comprise a number of user identification changes within a predefined time period, a number of pass word resets within a predefined time period, data transfer rates within a predefined time period, and a number of system changes within a predefined time period.

17. The system of claim 15, wherein:

the performance parameters are defined as a mean of the historical values for each the one or more key process indicators and a range of reasonable variation around the mean;

the range of reasonable variation around the mean is bounded by control limits comprising an upper control limit (UCL) that indicates a maximum value that is statistically reasonable and a lower control limit (LCL) that indicates a minimum value that is statistically reasonable; and the significant changes of the mean or variation are defined as eight or more data points in a row above or below the mean, non-random behavior, one or more data points outside the LCL or the UCL, and six or more data points strictly increasing or decreasing without deference to the mean, the LCL, or the UCL.

18. The system of claim 15, wherein the updating the performance parameters comprises recalculating the performance parameters using at least the collected new values that indicated the significant changes of the mean or variation.

* * * * *